Oct. 2, 1962
P. W. MILLER
3,056,344
VERTICAL BROILER WITH FOOD GRILL
Filed Nov. 30, 1960
2 Sheets-Sheet 1
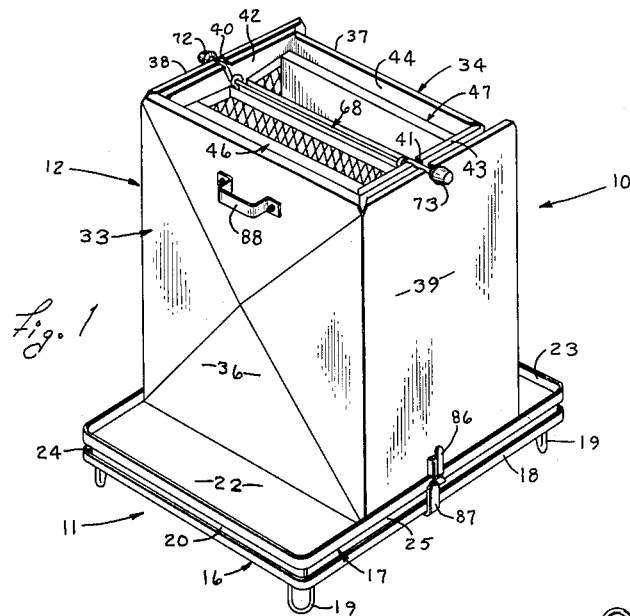
fig. 1
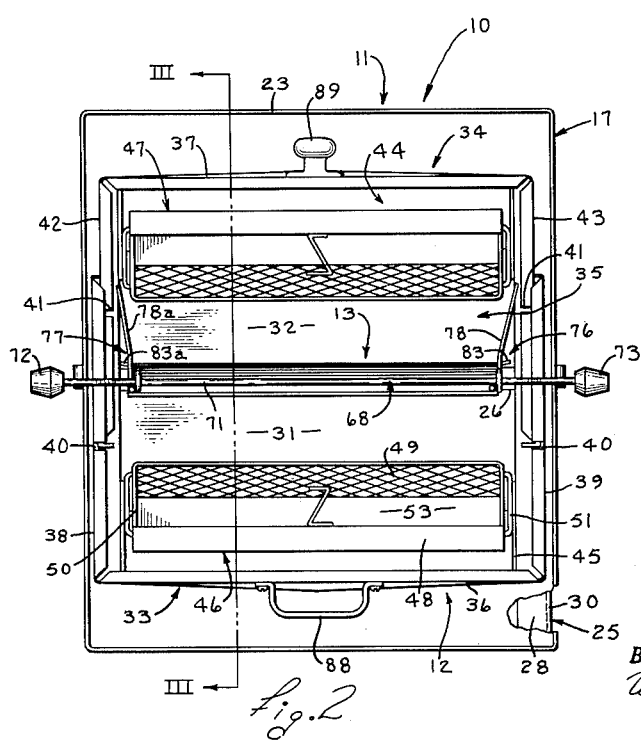
fig. 2
fig. 5
INVENTOR.
PAUL W. MILLER
BY
Woodhams, Blanchard & Flynn
ATTORNEYS

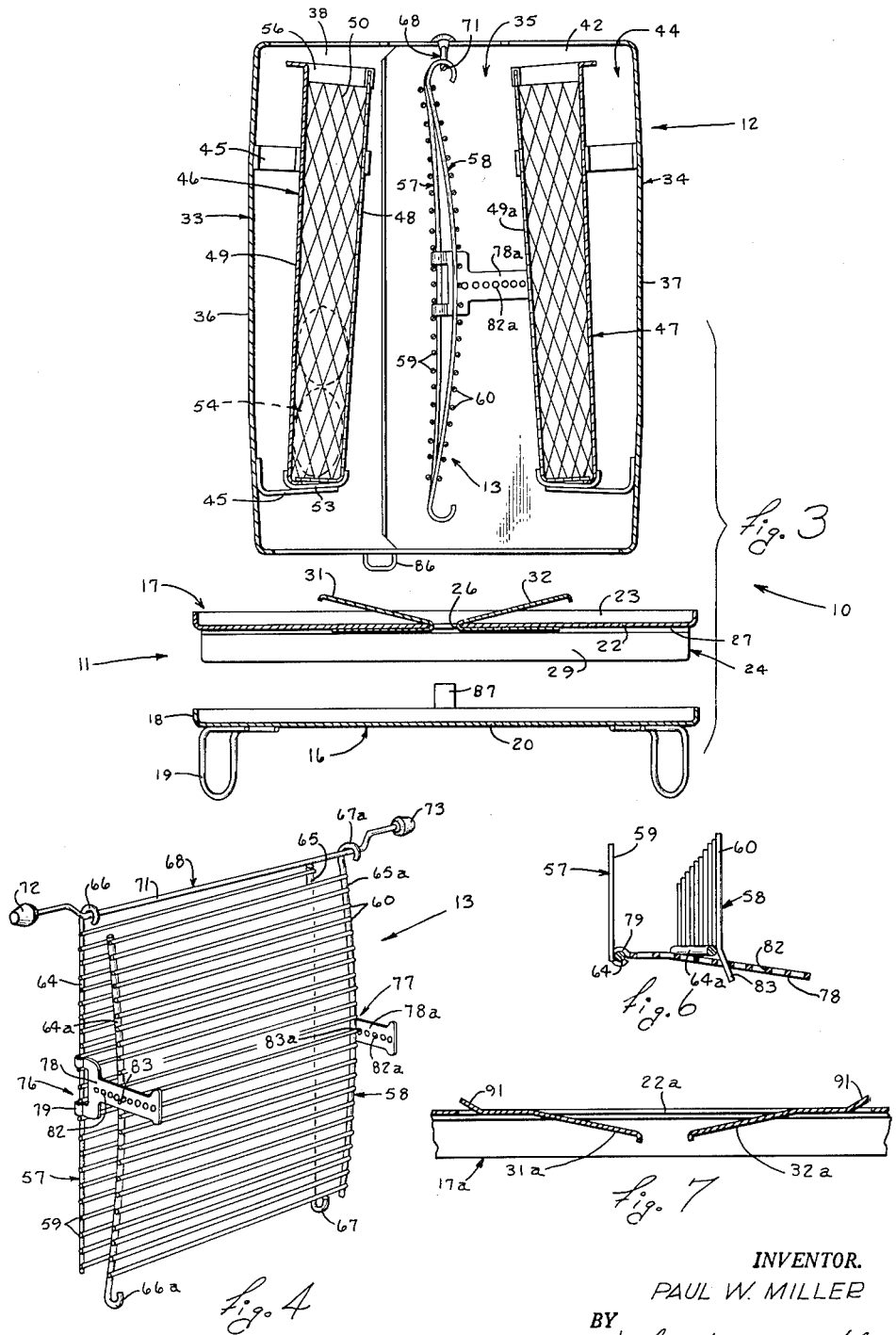

3,056,344
VERTICAL BROILER WITH FOOD GRILL
Paul W. Miller, 837 W. South St., Kalamazoo, Mich.
Filed Nov. 30, 1960, Ser. No. 72,714
10 Claims. (Cl. 99—390)

This invention relates in general to a vertical broiler and, more particularly, to a type thereof having an improved structure for supporting the charcoal and the food to be broiled.

The vertical broiler, having a pair of spaced and opposed, substantially vertical charcoal beds, has many advantages over the conventional, pan-type broiler with a horizontal charcoal bed. Some of these advantages have been discussed in detail in my copending patent application, Serial No. 813,165, now Patent No. 2,975,698. In a continuing effort to improve the performance of the vertical broiler disclosed in said application, I found that further effectiveness and efficiency of operation could be achieved by making certain changes in the existing structure of the broiler disclosed in said application.

More specifically, it was found that a more uniform heat could be produced more economically within the broiling chamber defined between the vertical charcoal beds by making material changes in the positions of and the means of support for the beds, both wtih respect to each other and with respect to the wall structure upon which they are supported.

Moreover, it was also found that very substantial improvements in the efficiency of the cooking operation could be achieved within the vertical broiler by means of an improved holder especially designed for use with a vertical broiler of this general character.

Accordingly, a primary object of this invention has been the provision of an improved vertical broiler having a more efficient broiling chamber and an improved, grill-type structure for supporting the food within the broiling chamber.

A further object of this invention has been the provision of a vertical charcoal broiler, as aforesaid, which is portable, very easy to clean, requires a minimum of charcoal to perform the cooking operation, which is arranged so that the charcoal can be quickly and easily ignited with a minimum amount of effort and which in addition, includes all of the essential and desirable characteristics set forth in detail in said application, Serial No. 813,165.

Other objects and purposes of this invention will become apparent to persons familiar with this type of equipment upon reading the following descriptive material and examining the accompanying drawings, in which:

FIGURE 1 is a perspective view of an improved vertical broiler including a food holder embodying the invention.

FIGURE 2 is a top plan view of said charcoal broiler in a different position of operation than that shown in FIGURE 1.

FIGURE 3 is an exploded, sectional view taken along the line III—III in FIGURE 2.

FIGURE 4 is a perspective view of the food holder used in and supportable within the broiling chamber of the vertical broiler.

FIGURE 5 is an end elevational view of said food holder.

FIGURE 6 is a sectional view taken along the line VI—VI in FIGURE 5.

FIGURE 7 is a fragment of FIGURE 3 showing an alternate structure for the support member.

For convenience in description, the terms "upper," "lower" and words of similar import will have reference to the vertical broiler and the food holder used therein and supported thereon, as appearing in FIGURES 1 and 4, respectively. The terms "inner," "outer" and derivatives thereof will have reference to the geometric center of said broiler and parts associated therewith.

General Description

The vertical broiler of the invention has a base structure including a support member or pan which is removably mounted upon a drip pan, both of which are preferably, but not necessarily, substantially flat and rectangular in shape. The support member has an elongated centrally disposed slot therethrough. A pair of substantially similar, channel-shaped wall members are removably and slidably supported upon the support pan so that their webs are substantially parallel and their side flanges are in overlapping arrangement. The wall members are mounted upon the support member so that they surround the slot in the support member.

A pair of upwardly opening, charcoal containers, which are preferably substantially rectangular in shape, are mounted upon and within said wall members. Said containers have perforate opposing walls which converge upwardly to define a broiling chamber, which is narrower at the top than at the bottom.

The food holder, which is disposed within the broiling chamber, has two perforate panels which are releasably secured with respect to each other by latch means interconnecting the opposite, lateral edges of both panels. One of said panels is arched and has its concave side facing the other panel. The food holder includes a hanger device for supporting the food holder upon the wall members and within the broiling chamber in several different positions.

Detailed Construction

The vertical charcoal broiler 10 (FIGURE 1), which has been selected to illustrate a preferred embodiment of the invention, is comprised of a base structure 11, an enclosed heating unit 12, which is supported upon the base structure, and the food holder 13 which is supported upon and within the heating unit 12.

The base structure 11 (FIGURES 1 and 3) includes a lower, drip pan 16 and an upper support member or pan 17, both of which are preferably, but not necessarily, rectangular and substantially flat. The drip pan 16 has a relatively short, upstanding side wall 18 and four supporting legs 19 which are secured to the bottom wall 20 near the four corners thereof. The support member 17, which is preferably of about the same size and shape as the drip pan 16 (FIGURE 3), has a bottom wall 22 with a centrally located, elongated opening 26 and an upstanding side wall 23, which preferably extends around the peripheral edge of said bottom wall.

The support member or upper pan 17 is supported upon, and is spaced upwardly from, the drip pan 16 by a pair of elongated angle members 24 and 25 (FIGURE 1) which have L-shaped cross sections. Said angle members 24 and 25 (FIGURES 3 and 2) have horizontal flanges 27 and 28, respectively, which are secured to the bottom wall 22 and extend along the opposite edges thereof transversely of the opening 26. Said angle members 24 and 25 have downwardly extending, substantially parallel flanges 29 and 30 which are engageable with the upper surface of the bottom wall 22 of the drip pan 16 adjacent the side wall 18 thereof. Thus, the flanges 29 and 30, which preferably extend the full length of the opposite sides of the drip pan 16, serve not only as legs for the support member 17, but also serve to block the movement of air between those edges of the upper and lower pans adjacent said angle members. It will be apparent that similar results can be effected by securing the flanges 27 and 28 to the bottom wall 22 of the drip pan 16 so that the vertical flanges 29 and 30 extend upwardly for engagement with and support of the support member 17.

A pair of elongated guide flanges 31 and 32 extend upwardly and sidewardly from the bottom wall 22 adjacent to, and along the length of, the opening 26. Said flanges 31 and 32 preferably project sidewardly to such an extent that they form a wide, substantially flat trough which extends completely under the broiling chamber 34, described hereinafter, and which converges at its lower end toward the opening 26 to guide fats and the like into the drip pan 16 therebelow.

The heating unit 12 (FIGURES 1, 2 and 3) is comprised of a pair of substantially identical, channel-shaped wall members 33 and 34 (FIGURE 2) having webs 36 and 37, respectively, and end flanges 38, 39 and 42, 43, respectively. The said webs and flanges, as well as the drip pan 16 and support member 17, are preferably fabricated from heat resistant sheet material, such as sheet metal. The wall members 33 and 34 are preferably constructed so that the flanges of one, here the flanges 42 and 43 of wall member 34, are slidably received between and adjacent to the flanges 38 and 39, respectively, of the wall member 33. The flanges 38, 39 and 42, 43 are preferably of such length that they are always in an overlapped condition, regardless of the spacing between the webs 36 and 37, when the wall members are supported upon the support member 17. Accordingly, said webs and flanges cooperate with the base structure 11 to provide a substantially rectangular enclosure defining a heating zone 44, which is open at its upper end and communicates at its lower end with the draft opening 26 in the bottom wall 22 of the support pan 17.

A pair of upwardly opening, charcoal containers or baskets 46 and 47 (FIGURES 2 and 3) are supported upon the wall members 33 and 34, respectively, between the end flanges thereof by the brackets 45 which are arranged and constructed to minimize the heat conducted thereby to the webs 36 and 37 upon which said brackets are secured.

The container 46, for example (FIGURE 2), is comprised of a pair of flat, rectangular side walls 48 and 49, a pair of end walls 50 and 51 and a bottom wall 53. The side wall 49 adjacent the web 36 and the bottom wall 53 are preferably solid whereas the side wall 48 and the end walls 50 and 51 are preferably perforate. The spacing between the side walls 48 and 49 is preferably and advantageously slightly greater than the thickness of a charcoal briquet indicated in broken lines at 54 in FIGURE 3. The container 46 is secured by the brackets 45 upon the wall member 33 so that the perforate side wall 48 diverges upwardly with respect to the web 36 for reasons appearing hereinafter. The container 46 is preferably so spaced from the web and flanges of the wall member 33 to minimize heat transfer thereto by radiation. A protective edge element 56 may be attached, if desired, to the upper edges of the side wall 49 and the end walls 50 and 51, because of their perforate construction.

The container 47 may be, and preferably is, substantially identical in structure with the container 46 and is secured in a similar manner upon the web 37 of the wall member 34. Accordingly, reference numerals applied to the various parts of the container 46 may also be applied with the suffix "a" to the corresponding parts of the container 47.

As shown in FIGURES 1 and 3, the upper edges of the containers 46 and 47 are preferably slightly below the upper edges of the wall members 33 and 34. The minimum spacing between the webs 36 and 37 may be determined by the engagement of the inner flanges 42 and 43 with the web 36, by contact of the webs 36 and 37 with the free edges of the guide flanges 31 and 32 or by engagement between the upper edges of said containers. In any event the broiling chamber 35 defined between the containers 46 and 47 converges upwardly. Because the end walls 50 and 51 of the container 46 are spaced from the adjacent flanges 38 and 39, the flanges 42 and 43 can freely slide between the container 46 and said flanges 38 and 39.

The upper edges of the flanges 38, 39 and 42, 43 have notches 40 and 41, respectively (FIGURE 2) which are aligned (FIGURE 1) when the flanges of the wall members 33 and 34 are fully overlapped.

The food holder 13 (FIGURES 3, 4 and 5) is comprised of a pair of flat grill members 57 and 58, which are preferably rectangular and similar in size and peripheral shape. The grill members 57 and 58 may be fabricated from metal wire, for example, and the grill member 58 is preferably slightly curved so that it defines a portion of a cylinder. In this particular embodiment, the grill members 57 and 58 each have a plurality of parallel, horizontal grill elements 59 and 60, which are secured to and extend between upright frame elements 64, 65 and 64a, 65a. The frame elements 64 and 65 have integral hooks 66 and 67, respectively, at one end of each. The two frame elements 64 and 65 are arranged so that their hooks 66 and 67 extend from opposite edges of the grill 57. The frame elements 64a and 65a have similarly arranged hooks 66a and 67a. In FIGURE 4 the hooks 66 and 67a are shown at the upper ends of their respective grills and the hooks 66a and 67 are at the lower ends of their respective grills. However, this arrangement can be reversed.

An elongated rod 68 has a central, offset portion 71 and a pair of handles 72 and 73 on the opposite ends thereof. The offset portion 71 is of sufficient length that it can be engaged simultaneously near the opposite ends thereof by the hooks 66 and 67a or the hooks 66a and 67 when the grill members 57 and 58 are in their operating positions of FIGURES 3 and 4.

The rod 68 is of such diameter that it can be easily received into the aligned notches 40 and 41 when the wall members 33 and 34 are in their FIGURE 1 positions, thereby holding such wall members 33 and 34 together.

Said grill members 57 and 58 are held with respect to each other in said opposing positions by the latch devices 76 and 77 (FIGURE 4). The latch device 76, for example (FIGURES 4, 5 and 6), is comprised of an elongated latch member 78 having coaxial hinge sleeves 79 at one end thereof which, in this particular embodiment, embrace the frame element 64 preferably approximately midway between the ends thereof to pivotally support said latch member 78 thereon. The latch member 78 has a plurality of uniformly spaced pin openings 82 therethrough which are aligned lengthwise thereof. A latch pin 83 is secured to the frame element 64a on the grill 58 midway between the upper and lower ends thereof and extends sidewardly therefrom in a direction approximately parallel with the grill elements 60 of the grill member 58. The latch pin 83, which for convenience may be an extension of one of the grill elements 60, is receivable through any one of the pin openings 82. The pin 83 may be bent slightly away from the grill 57, as shown in FIGURE 6, to improve its holding ability.

The latch device 77 includes a latch member 78a which is hingedly supported upon the frame element 65 for engagement by a latch pin 83a secured upon the frame elements 65a in the same manner as set forth above with respect to the latch device 76. Accordingly, the relative positions of the grill members 57 and 58 may be varied with respect to each other while still permitting a positive holding therebetween by means of the latch members 78 and 78a and the corresponding latch pins 83 and 83a.

The frame elements 64, 64a and 65, and 65a are resiliently flexible so that, when food is disposed between the grill members 57 and 58, as indicated in broken lines at 84 in FIGURE 5, the curved grill member 58 will be flattened slightly and the flat grill member 57 will be slightly curved so that food 84, such as meat, will be firmly gripped and held between the two grill members.

A clamp mechanism, such as the buckle 86 (FIGURE 1), may be mounted upon the outer sides of the flanges 38 and 39 adjacent the support member 17 for the purpose of releasably engaging a hook 87 on the drip pan 16 at both ends thereof and thereby holding the drip pan 16, the support member 17 and the wall member 33 together for easy transportation. A handle 88 is mounted upon the outer surface of the web 36 near its upper end for the purpose of raising and transporting the entire broiler 10. A knob 89 is mounted upon the outer surface of the web 37 adjacent the upper end thereof.

*Operation*

The broiler 10 (FIGURE 1) is portable as a single structure when assembled as shown in FIGURE 1. That is, the two wall members 33 and 34 are disposed with their flanges in the substantially fully overlapped positions so that the notches 40 and 41 in their upper edges are aligned and the rod 68, which supports the food holder 13, is disposed in said notches whereby movement of said wall members 33 and 34 away from each other is positively opposed. Each buckle 86 (FIGURE 2) is fastened to its hook 87 (FIGURE 1) so that the flanges 38 and 39, hence the wall member 33, are held with respect to both the drip pan 16 and the support member 17. With the broiler 10 thus assembled, it can be moved conveniently by manually grasping the handle 88.

When it becomes desirable to use the broiler 10, the broiler 10 is placed in an upright position either indoors or outdoors, and the buckles 86 are unfastened. The rod 68 is raised out of the notches 40 and 41 and the wall members 33 and 34 are moved away from each other by manually grasping the handle 88 and the knob 89. The food holder 13 is now lifted out of the broiling chamber 55 between the baskets 46 and 47. If desired, the food holder 13 may be placed in the horizontal position with the grill member 57 supported upon the upper edges of the wall members 33 and 34. The latch members 78 and 78a are then pivoted away from each other so that they become disengaged from their respective latch pins 83 and 83a (FIGURE 4). Meat or other food 84 (FIGURE 5) is then placed upon the grill member 57 after which the grill member 58 is then placed upon the top of the meat. The upwardly arched, central portion of the grill member 58 is manually depressed to place same under a stress after which the latch members 78 and 78a are moved one at a time into engagement with their respective latch pins 83 and 83a. The resiliency of the flexed grill members 57 and 58 tends to hold the meat 84 snugly between the two grill members. The wall members 33 and 34 are now moved together until their flanges are in the fully overlapped positions so that the upper adjacent edges of the containers 46 and 47 will be substantially contiguous. Charcoal briquets or the like may now be conveniently and easily directed from a package thereof into the containers 46 and 47 simultaneously. In this particular embodiment, the containers 46 and 47 are constructed so that the distance between the side walls in each container is only slightly greater than the thickness of a conventional charcoal briquet. It has been found that a satisfactory broiling heat can be produced for approximately one hour by the amount of charcoal (about 15 briquets) required to half fill each container. Thus, the broiler 10 can be operated very economically.

If it is desirable to use the broiler 10 immediately, kindling such as a few pieces of newspaper, may be placed within the broiler chamber 55 so that they rest upon the guide flanges 31 and 32. It has been found that the charcoal briquets in the containers 45 and 47 can be ignited by the flames from five double pages of newspaper which have been crumpled and placed in the broiling chamber 55 with the upper ends of the containers in their closest relative positions. The upward convergence of the perforated walls 49 and 49a facilitates the ignition of the charcoal and, as discussed hereinafter, causes the ignited charcoal to produce a more uniform broiling heat vertically of the broiler.

When the charcoal has attained the proper condition for broiling, which usually requires about 15 minutes, the wall members 33 and 34 are moved apart. The hooks 66 and 67a at one end of the food holder or the hooks 66a and 67 at the other end of the food holder are now caused to engage opposite ends of the rod 68 so that the food holder 13 is suspended from the rod 68. The food holder 13 is then inserted into the broiling chamber 55 until the end portions of the rod 68 rest upon the upper edges of the flanges 38, 39, 42 and 43.

The structures of the heating unit 12 and the base structure 11 are such that a very effective draft moves through the opposite ends of the zone defined between the drip pan 16 and the support member 17 and then upwardly through the opening 26 in the support members 17 and the broiling chamber 55. The flanges 29 and 30 on the angle members 24 and 25 block the entry of air into the zone between the drip pan 60 and the support member 17 through two opposite sides thereof. Moreover, the convergence of the chamber 55 creates a constriction which tends to keep the heat in the broiling chamber as long as possible without suffocating the combustion.

The broiler 10 will perform satisfactorily out-of-doors and in the open under unfavorable weather conditions. That is, any effect which high winds might have upon the operation of the broiler can be overcome by placing the broiler so that the flanges 29 and 30 are crosswise of the direction in which the air is moving. The adverse effects which might be developed by precipitation can be overcome by placing a fire-proof sheet on top of the wall members 33 and 34 so that it covers the broiling chamber and the containers 46 and 47. Because the upper edges of the containers are well below the upper edges of the wall members, the gases of combustion can escape adjacent the webs 36 and 37.

A fire-proof cover can also be used to control the performance of the broiler. Moreover, the performance of the broiler can be further controlled by damping the openings at the opposite ends of the zone between the drip pan 16, the support member 17, and the flanges 29 and 30.

After the initial searing has been accomplished, the channel members 33 and 34 can be moved apart as desired or required to produce the slower broiling heat which may be required, especially on the thicker cuts of meat. Under some circumstances it may be desirable to change the position of the food holder 13 and, particularly, it may be desirable to invert the food holder 13 so that the juices, which tend to move downwardly, can flow back through the meat in the opposite direction. Such reversal can be effected quickly and easily by manually grasping the handles 72 and 73 on the rod 68 and raising the food holder 13 out of the broiling chamber 55. Said food holder can be rested upon the upper edges of the wall members 33 and 34 while the rod 68 is being disengaged from the hooks 66 and 67a, for example, and being reengaged with the hooks 66a and 67. Thereafter, the food holder 13 is again raised into its substantially vertical position by the rod 68 and reinserted into the broiling chamber 55, now in the inverted position.

Because of the fact that the grill member 58 is pivotally supported upon the grill member 57 by means of the latching devices 76 and 77, the food holder 13 automatically adjusts itself to cuts of meat having irregular shapes. Moreover, because of the plurality of pin openings 82 and 82a in the latch members 78 and 78a, the food holder 13 can be adapted to hold foods of various thicknesses as well as various shapes.

An alternate support member 17a (FIGURE 7) may be provided with integral guide or drain flanges 31a and 32a which slope downwardly toward each other from the bottom wall 22a. In such case, ears 91 may be struck upwardly out of the bottom wall 22a to engage the wall members 33 and 34 (FIGURE 3) to maintain the minimum spacing therebetween, where desired.

Although a particular preferred embodiment of the invention has been disclosed in detail above for illustrative purposes, it will be understood that variations or modification of such disclosure, which come within the scope of the appended claims, are fully contemplated.

What is claimed is:

1. An upright broiler construction comprising:
    a drip pan having means defining a liquid retaining zone thereon;
    a support member and means supporting same above and spaced from said drip pan, said support member having an elongated opening through the portion thereof directly above said zone;
    a pair of channel-shaped wall members supported upon said support member, said wall members having substantially parallel, upright webs disposed upon opposite sides of said elongated opening, and each wall member having a pair of substantially parallel flanges in overlapping arrangement with the corresponding flanges on the other wall member at the opposite ends of said opening; and
    a pair of upwardly opening charcoal containers, and means supporting each container upon one of said wall members between the flanges thereof, each container having a pair of side walls, a pair of end walls, and a bottom wall, the adjacent side walls of said containers being perforate and converging upwardly, whereby, when said flanges are fully overlapped, the upper end of said perforate walls are close to each other.

2. The structure of claim 1 including a pair of substantially flat grills having connecting devices at corresponding points on the opposite edges thereof substantially intermediate the ends thereof for releasably holding said grills against movement away from each other, said grills being pivotally movable with respect to each other around an axis extending through said pair of connecting devices; and
    support means including engaging elements on said grills and an elongated member engaged by said elements for supporting said grills beneath said elongated member, said elongated member being supported upon and between said flanges with said grills between said perforate walls.

3. The structure of claim 1 wherein the end walls of each container are perforate;
    wherein the bottom wall of each container is imperforate and is spaced upwardly from the lower edge of its respective wall member; and
    wherein both side walls of each container diverge upwardly with respect to the web of their wall member.

4. The structure of claim 2 wherein the upper edge of each flange has a recess therein, said recesses being aligned when said flanges are substantially fully overlapped; and
    wherein said support means includes an elongated rod extending across the said flanges and received into said recesses, and said engaging elements are hooks releasably engaged with said rod.

5. The structure of claim 1 wherein said drip pan and said support member have similar rectangular peripheral shapes, and one of said drip pan and said support member has integral side walls along the opposite sides thereof extending toward the other one of said drip pan and said support member, whereby the movement of air between said support member and drip pan is blocked along two opposite sides thereof.

6. The structure of claim 1 wherein said support member has a pair of integral upwardly diverging guide plates which extend along the opposite lengthwise edges of the elongated opening therein, said guide plates defining the bottom wall of the zone between the perforate side walls when said flanges are substantially fully overlapped.

7. A food holding device for support within a vertical broiling chamber defined by the perforate adjacent sides of a pair of spaced and upwardly opening, charcoal containers mounted respectively upon a pair of wall means movable toward and away from each other comprising:
    first and second grill members of similar size and shape, one of said grill members being arched and having a concave surface facing the other grill member;
    latching means mounted upon and extending between said grill members along opposite corresponding edges thereof adjacent the central portions thereof for releasably connecting the first grill member with respect to the second grill member and positively preventing movement of the central portions of said grill members away from each other;
    support means removably mounted upon the wall means and releasably engageable by said grill members for supporting same in substantially vertical positions within the broiling chamber between the containers.

8. The structure of claim 7 wherein said grill members are substantially rectangular, and said opposite edges of said one grill member are curved and have their concave sides facing the other grill member;
    wherein said latching means includes a pair of elongated flat members hingedly supported upon the first grill member approximately midway between the ends of said curved edges, each of said flat members having an opening therein, and pin means on said second grill member receivable into said openings in said flat members.

9. The structure of claim 7 wherein said grill members are substantially rectangular;
    wherein each grill member includes a pair of spaced, vertical elements, the vertical elements on said one grill member being curved with said concave surface, and each vertical member having a hook at one end thereof, the hooks on one grill member being near one pair of diagonal corners thereof and the hooks on the other grill member being near the other pair of diagonal corners thereof; and
    wherein said support means includes a rod supported upon said wall means and engaged by two of said hooks for suspending said grill members from said rod in substantially vertical positions.

10. A food holding device for support within a vertical broiling chamber defined by the opposing sides of a pair of spaced, charcoal containers and wall means upon which said containers are mounted for movement toward and away from each other, comprising:
    first and second grill members of similar size and shape, each grill member having opposite side edges and opposite end edges;
    a pair of elongated, flat members hingedly supported upon the side edges of the first grill member approximately midway between the end edges thereof, each of said flat members having at least one opening therethrough;
    a pair of approximately coaxial pin means secured to the opposite side edges of said second grill member, said pin means extending in substantially opposite directions away from said side edges approximately midway between the end edges of said second grill member, said pin means being respectively receivable into said openings in said flat members; and support means removably mounted upon the wall means and releasably engageable by said grill members for supporting same in substantially vertical positions within the broiling chamber between the containers.

References Cited in the file of this patent

UNITED STATES PATENTS

| | | |
|---|---|---|
| 890,219 | Cook | June 9, 1908 |
| 1,251,232 | Hubbard | Dec. 25, 1917 |
| 1,712,474 | Serrell | May 7, 1929 |
| 2,335,217 | Tate | Nov. 23, 1943 |
| 2,839,989 | Persinger | June 24, 1958 |
| 2,975,698 | Miller | Mar. 21, 1961 |